(12) United States Patent
Kenmore et al.

(10) Patent No.: US 9,073,032 B2
(45) Date of Patent: Jul. 7, 2015

(54) SYSTEM, APPARATUS, AND METHODS FOR DISPOSAL OF FLUID WASTES

(71) Applicant: Kenmore Holdings Inc., Medicine Hat, CA (US)

(72) Inventors: Ferron Kenmore, Medicine Hat, CA (US); Tyrel Kenmore, Medicine Hat, CA (US)

(73) Assignee: Kenmore Holdings Inc., Medicine Hat (CA)

( * ) Notice: Subject to any disclaimer, the term of this patent is extended or adjusted under 35 U.S.C. 154(b) by 0 days.

(21) Appl. No.: 13/969,283

(22) Filed: Aug. 16, 2013

(65) Prior Publication Data

US 2014/0048138 A1 Feb. 20, 2014

(30) Foreign Application Priority Data

Aug. 17, 2012 (CA) ..................................... 2787745

(51) Int. Cl.
*E21B 21/06* (2006.01)
*B01J 19/06* (2006.01)
*C02F 11/00* (2006.01)

(52) U.S. Cl.
CPC ............... *B01J 19/06* (2013.01); *E21B 21/062* (2013.01); *C02F 11/008* (2013.01)

(58) Field of Classification Search
CPC ....... E21B 21/062; C02F 11/008; B01J 19/06

USPC ........................................................... 588/255
See application file for complete search history.

(56) References Cited

U.S. PATENT DOCUMENTS

| | | | | |
|---|---|---|---|---|
| 1,541,352 | A * | 6/1925 | Halliburton | 366/5 |
| 3,980,558 | A * | 9/1976 | Thompson | 588/252 |
| 4,142,912 | A * | 3/1979 | Young | 588/252 |
| 4,858,965 | A * | 8/1989 | Fuller et al. | 285/189 |
| 7,670,277 | B2 * | 3/2010 | Ross et al. | 588/256 |
| 8,168,067 | B2 * | 5/2012 | Woods et al. | 210/662 |
| 2011/0176871 | A1 * | 7/2011 | St. Pierre et al. | 405/128.5 |
| 2014/0175008 | A1 * | 6/2014 | Mathis | 210/602 |

FOREIGN PATENT DOCUMENTS

WO    WO9957368    * 11/1999

* cited by examiner

*Primary Examiner* — John Kreck
(74) *Attorney, Agent, or Firm* — Faegre Baker Daniels LLP (57) ABSTRACT

A system may facilitate recovery and solidification of a fluid waste during its transfer into a transportable bulk container. The system comprises: (i) a metered supply of a solidifying agent; (ii) a metered supply of a bulking material, (iii) apparatus for commingling the metered supplies of solidifying agent and bulking material, and (iv) a tee apparatus having a first port for engaging and receiving the fluid waste, a second port for engaging and receiving a commingled supply of a mixing agent and a bulking material, and a third port for discharging the fluid waste and commingled mixing agent and bulking material.

20 Claims, 5 Drawing Sheets

SYSTEM, APPARATUS, AND METHODS FOR DISPOSAL OF FLUID WASTES

CROSS-REFERENCE TO RELATED APPLICATION

This application claims priority to Canada Application No. 2,787,745, filed Aug. 17, 2012, which is herein incorporated by reference in its entirety.

TECHNICAL FIELD

This disclosure relates to disposal of fluid waste materials. More particularly, this disclosure relates to systems, apparatus, and methods for solidifying fluid waste materials to facilitate their cartage to and disposal in landfill waste disposal sites.

BACKGROUND

Extraction and recovery of crude oil and natural gas from subterranean geological formations and reservoirs requires the drilling of well bores for installation of piping and casings for connecting extraction equipment with the crude oil and/or gas deposits. Drilling such well bores, also commonly referred to as bore holes, requires use of drilling fluids, also called drilling muds, to provide lubrication and cooling for drill bits during drilling operations and to remove rock cuttings and crushed particulates from the drilling faces. Drilling fluids are typically pumped under pressure through a rotating drill pipe to the drilling face, where they flow out of the drill pipe through the drill bits thereby providing cooling to the drill bits, and then return under pressure to the surface between the drill pipe and well casings that are installed as part of the drilling process, thereby removing rock cuttings and particulates from the drilling face and the bits. Drilling fluids are continuously pumped and re-circulated through the drill pipe and casing during drilling operations.

Drilling fluids generally comprise oil or water plus several other components to provide: (i) lubricity and cooling during drilling, and (ii) fluid stabilization through viscosity or gelling when drilling stopped, to maintain the rock cuttings and particulates in suspension. Drilling fluids typically comprise one or more clays for their viscosity properties plus one or more chemicals for one or more of lubrication, cooling, emulsifying, surfaction, rheology modification, "wetting", controlling the density of the drilling fluids, and to provide thixotropic properties. As drilling continues for extended periods of time, drilling fluids become saturated with rock cuttings particulates, and contaminants such as subterranean water, brines and crude oil released during the drilling process. The lubricity and cooling properties of saturated drilling fluids are significantly reduced, while the presence of cuttings and particulates requires more pumping pressure to maintain recirculation flow rates. Methods and apparatus are available for extending the life of drilling fluids by removal of solids and particulates through screening, coagulation, flocculation, and by dewatering. However, these methods and apparatus are not capable of removing very small particulate materials which continue to accumulate until they saturate the drilling fluids. Such drilling fluids are considered "spent" and are removed from drilling operations.

Recent increased demands for natural gas supplies have resulted in drilling new wells into more technically challenging subterranean deposits, and in reworking of existing wells where down-hole pressure and gas production rates have declined. In both types of situation, a common technique is to fracture reservoir rock with very high pressure water containing very dense granular proppant materials to keep fractures created by the high pressure water propped open after water pressure is reduced. Such fluids are commonly referred to as "fracking fluids". Such processes are completed by producing the fluids at very high rates to lift excess proppants and particulates produced during the high pressure water flows, to the surface to clear the well bore so that gas flows more freely. The washing-out processes typically are done under high pressure and produce a high-volume three-phase fluid waste flow of gas, liquids, and particulates. Conventional fluid waste flow systems used to separate gas and liquids, typically cannot accommodate the volumes of fluid wastes generated during opening up and conditioning of gas well bores. Consequently, specialized transportable systems and equipment have been developed to sequentially separate gas and then sand from fluid wastes, followed by flocculation of suspended particulates and their removal by centrifugation, resulting in large volumes of fluid wastes that have contain large quantities of very small particles, e.g., in the range of $0.1\mu$ to about $0.5\mu$. Such fluid wastes are stored for extended periods of time in holding tanks or lagoons to enable settling to occur.

Completion of a drilled well requires removal of a drill string from the bored well hole in combination with pumping of drilling mud to fill the void created as the drill string is moved up. In situations where the drill string is removed more rapidly than the rate of mud pumping, a common result is that the formation fluids and gases (i.e., ground water and other geological fluids) may permeate into the void resulting in significantly decreased bottom hole pressure. The permeation of formation fluids and gases into bore hole voids is commonly called "swabbing" and results in unstable wells that may be dangerous to operate. A common practice to eliminate swabbing during the removal of drill strings is to purge the bore hole by insertion of a paired coiled tubing to about the bottom of the hole after which a clean-out fluid is pumped to the bottom of the hole through one of the coiled tubes while the return clean-out solution is pumped to the surface through the other coiled tube. The return clean-out solution typically comprises formation fluids, drilling mud, clean-out fluid and particulates produced during the drilling process. The return clean-out solution is typically transferred into holding tanks where it is generally stored for periods of time to allow the particulates to settle out, after which the remaining fluids may be clarified by flocculation and centrifugation.

The bore holes of producing gas wells are regularly infiltrated with formation water, clay particulates, and silts over time. These accumulations will increasingly impede and choke-off gas flow, and therefore, producing gas wells are regularly shut-down and cleaned out with swabber devices to remove the formation accumulation mixtures of water, clay and silt. In situations where formation accumulations are significant, the cleaning action of swabber devices is often facilitated by injection of air under pressure by coiled tubing. Similar issues encountered with drilling and well completion, are also associated with handling and disposal of the formation fluid wastes removed from producing gas wells during routine maintenance with swabber devices and coiled tubing. The frequency of production gas well maintenance with swabbers and coiled tubing is site-specific and dependent on the geological properties, and is scheduled on a monthly, or quarterly or semi-annual basis to ensure sustained high-volume production.

Considerable volumes of spent drilling fluids, fracking fluids, and return clean-out solutions accumulate during installation and operation of a well bore, and even greater volumes of fluid wastes are generated during regular swabber and coiled tubing maintenance of production gas wells. These fluid wastes are consequently stored onsite in holding tanks for extended periods of time to enable at least some of the small particulate materials to settle to the bottom of the holding tanks It is common practice to dewater spent drilling fluids by centrifugation to further remove the small particulate solids. However, the waste slurry materials produced are still very fluid and flowable. Waste slurries recovered by settling and/or dewatering spent drilling fluids commonly have high levels of heavy metals and other toxic contaminants, and consequently, their disposal is strictly regulated by various Government agencies. Most regulatory waste disposal requirements stipulate that such liquid wastes must be solidified prior to their cartage from the drilling/waste treatment sites. Elaborate systems and equipment have been developed to mix dry materials into drilling fluid waste slurries to produce agglomerates that can be further dried into bulk materials that can be loaded and transported with conventional aggregate handling equipment. Such systems require considerable infrastructure and capital investment to process the spent drilling fluid outputs from drilling sites.

SUMMARY

The embodiments of the present disclosure relates to systems and methods for recovery and solidification of fluid wastes during their transfer into transportable bulk containers.

The exemplary embodiments of the systems of the present disclosure generally comprise: (i) a metered supply of a solidifying agent; (ii) a metered supply of a bulking material, (iii) apparatus for commingling the metered supplies of solidifying agent and bulking material, and (iv) a tee apparatus having a first port for engaging and receiving the fluid waste, a second port for engaging and receiving a commingled supply of a mixing agent and a bulking material, and a third port for discharging the fluid waste and commingled mixing agent and bulking material. The systems may also comprise transportable bulk containers.

The exemplary methods of the present disclosure generally comprise the steps of: (i) recovering a fluid waste from a holding facility and conveying the fluid waste to a first port provided therefore in a tee apparatus; (ii) commingling a supply of a solidifying agent and a supply of a bulking material, and conveying the commingled solidifying agent and bulking material to a second port provided therefore in the tee apparatus; and (iii) concurrently discharging from a third port provided therefore in the tee apparatus into a transportable bulk container, the fluid waste and the commingled solidifying agent and bulking material.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The present disclosure will be described in conjunction with reference to the following drawings, in which:

FIG. 2(A) is a cross-sectional end view of an exemplary embodiment of the present disclosure, while 2(B) is a cross-sectional side view of the embodiment shown in FIG. 2(A);

FIG. 4(A) is a cross-sectional view showing an alternative embodiment of the device shown in FIG. 3, while 4(B) is a cross-sectional view showing another alternative embodiment of the device shown in FIG. 3.

DETAILED DESCRIPTION

The embodiments disclosed herein relate to systems, apparatus, and methods for solidifying fluid waste materials to facilitate their cartage to and disposal in off-site waste disposal sites.

The methods, systems and apparatus of the present disclosure are particularly suitable for expeditious recovery and disposal of spent drilling fluids that have been clarified and de-watered much as much as possible using methods and equipment known to those skilled in these arts, such as screening, filtering, decanter centrifugation and the like. The problem with such processed spent drilling fluids is that they still retain significant amounts of very small particulates which vary in size from about $0.1\mu$ to about $0.5\mu$ and consequently, do not readily settle out of solution but remain suspended throughout the fluids for extended periods of time. The industry typically stores such processed spent drilling fluids in holding facilities such as concrete tanks, rubber-lined ponds, and the like, for extended periods of time. Alternatively, flocculants and/or coagulants may be vigorously mixed into the processed spent drilling fluids which are then centrifuged to remove flocculated materials, followed by further storage in the holding facilities. Other approaches involve intermixing solidifying agents and bulking materials directly into processed spent drilling fluids. The solidifying agents typically comprise powdered or granular polyacrylamide gels that swell and form semi-solid gels upon contact with water. Bulking materials commonly used in these types of applications include sawdust, clays, and fibrous substrates exemplified by peats, to provide structural support for the semi-solid gels formed when the powdered or granular gels are contacted by water. After solidification has occurred, the solidified materials are recovered from the holding facilities, i.g., tanks or ponds, by suitable equipment and loaded into transportable bulk containers for cartage to waste disposal sites. Such methods and systems for solidifying processed spend drilling fluids to make them suitable for bulk handling and transport are costly, time-consuming and require expensive infrastructure and capital expenditures.

In general, embodiments of the methods disclosed herein include the steps of removing fluid wastes from holding facilities, conveying the fluid wastes to transportable bulk containers, during transfer of the fluid wastes into the transportable bulk containers commingling the fluid wastes with a mixture of solidifying agents and bulking materials whereby the fluid wastes solidify during and after their disposal into the transportable bulk containers.

Embodiments of the systems of the present disclosure pertain to conduits for conveying the fluid wastes from the holding facilities to the transportable bulk containers, to equipment for recovery of the fluid wastes from the holding facilities into the conduits and for conveyance of the fluid wastes through the conduits to the transportable bulk containers and for discharge of the fluid wastes from the conduits, to containers for separately holding therein and supplying therefrom solidifying agents and bulking materials, to equipment for measurably dispensing materials from each of the containers holding the solidifying agents or bulking materials into a conduit infrastructure wherein the solidifying agents and bulking materials are commingled and conveyed, equipment for conveying the commingled solidifying agents and bulking materials through the conduit infrastructure to a transportable bulk container, and a dispensing apparatus for (i) engaging a conduit conveying the fluid wastes, (ii) separately engaging a conduit conveying the commingled solidifying agents and bulking materials, and (iii) concurrently discharging the fluid wastes and the commingled solidifying agents and bulking materials through a single discharge port into the transportable bulk container.

The systems may additionally comprise control devices for operating and/or controlling the equipment for recovering fluid wastes from holding facilities into conduits, for conveying fluid wastes within the conduits from the holding facilities to the transportable bulk containers, for dispensing solidifying agents and/or bulking materials from their holding containers, for conveying the dispensed solidifying agents and bulking materials through conduits to the transportable bulk containers. The control devices may be hydraulically controlled or alternatively, electrically and/or electronically controlled.

The systems may additionally comprise devices for engaging thereonto and positioning the dispensing apparatus above and/or into the top of transportable bulk containers. The devices enable positioning of the dispensing apparatus so that the concurrently discharged fluid wastes and commingled solidifying agents and bulking materials can be directed toward different locations within the transportable bulk containers to provide desired load distribution and balance within the containers. Those skilled in these arts will understand that there are different ways and locations that devices can be positioned above transportable bulk containers. For example, a device may be mounted onto a structure that engages one or more sides of a transportable bulk container, or alternatively, may engage the top of the transportable bulk container. The structure on a transportable bulk container may be movable along the top of the transportable bulk container so that the concurrently discharged fluid waste and commingled solidifying agents and bulking materials can be distributed throughout the transportable bulk container as desired. Alternatively, the structure onto which the device is mountable may be permanently installed onto a framework under which a transportable bulk container can be positioned and then repositioned as necessary during discharging of the fluid waste and commingled solidifying agents and/or bulking materials so that the solidified fluid waste is distributed throughout the transportable bulk container as desired. The framework may be a stand-alone structure permanently fixed into place, or alternatively, a stand-alone structure that can be assembled for use at one holding facility, then disassembled for transport and use at another holding facility. Alternatively, a suitable structure may be permanently positioned and mounted into or onto a building wall or wall framework such that a transportable bulk container can be positioned under the dispensing apparatus and then re-positioned as the container is being filled with the concurrently discharged fluid waste and commingled solidifying agents and bulking materials.

Suitable transportable bulk containers are exemplified by dump boxes mounted onto a truck chassis, dump boxes mounted onto trailers that are engageable by or towable by truck tractors, demountable boxes that can be off-loaded from a truck or a trailer at a waste fluid holding facility for dispensing thereinto of concurrently discharged waste fluids and commingled solidifying agents and bulking materials, and then retrieved when filled with solidified fluid wastes, and the like containers.

Suitable solidifying agents for use with the systems and methods of the present disclosure are exemplified by superabsorbent polymer powders and gels that are able to absorb up to five hundred times their weight in water. Suitable superabsorbent polymer powders and gels are exemplified by sodium polyacrylates, polyacrylamide copolymers, ethylene maleic anhydride copolymers, cross-linked carboxymethylcellulose, polyvinyl alcohol copolymers, cross-linked polyethylene oxide, starch-grafted copolymers of polyacrylonitrile, the like, and combinations thereof. Sodium polyacrylates are particularly suitable for use as solidifying agents in the methods and systems of the present disclosure. The particle sizes of the superabsorbent polymer powders and gels that are useful in the methods and systems of the present disclosure are generally in the range of about 50μ to about 4 mm. The solidifying agent may comprise a heterogenous mixture of particles ranging in size from about 50μ to about 4 mm. If so desired, a more homogenous mixture of superabsorbent polymer particle sizes ranging in size from about 200μ to about 800μ may be provided. A particularly suitable superabsorbent polymer is exemplified by WASTE LOCK® 770 (WASTE LOCK is a registered trademark of M2 Polymer Technologies Inc., West Dundee, Ill., USA).

Suitable bulking materials for use with the systems and methods of the present disclosure are exemplified by pulverized wood pellets, sawdust, peats, and the like. Particularly suitable for use as bulking materials are sawdust pellets produced as fuel for wood-fired stoves, that have been pulverized using a hammer mill or similar equipment.

Suitable ratios of solidifying agent to bulking materials are about 1:10 (w:w), 1:7.5 (w:w), 1:5 (w:w), 1:4.5 (w:w), 1:4 (w:w), 1:3.5 (w:w), 1:3 (w:w), 1:2.5 (w:w), 1:2 (w:w), 1:1.5 (w:w), 1:1 (w:w), 1:0.5 (w:w), and therebetween.

Figure 1:
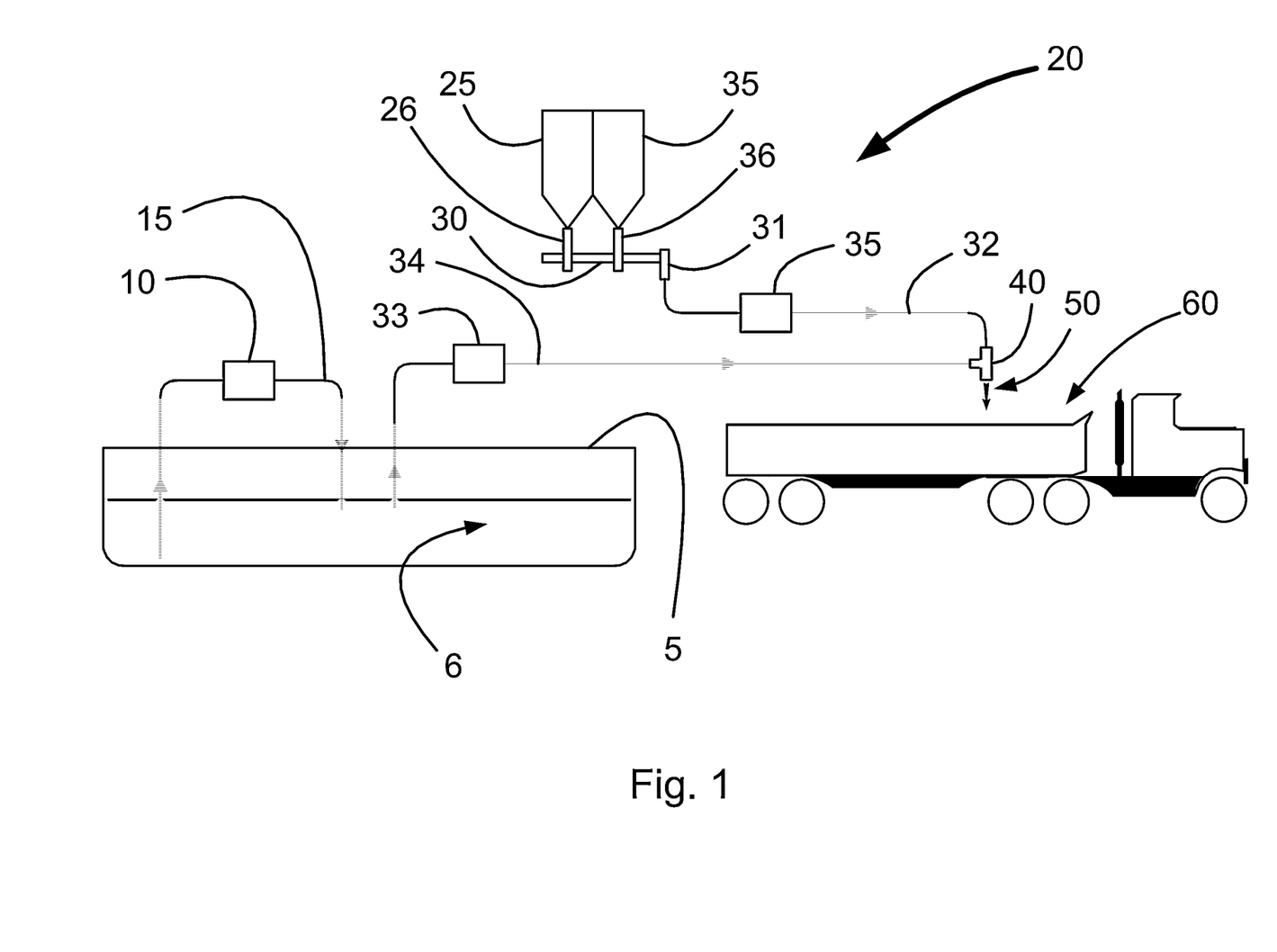
FIG. 1 is a schematic illustration of an exemplary system according to one embodiment of the present disclosure.
Figure 2:
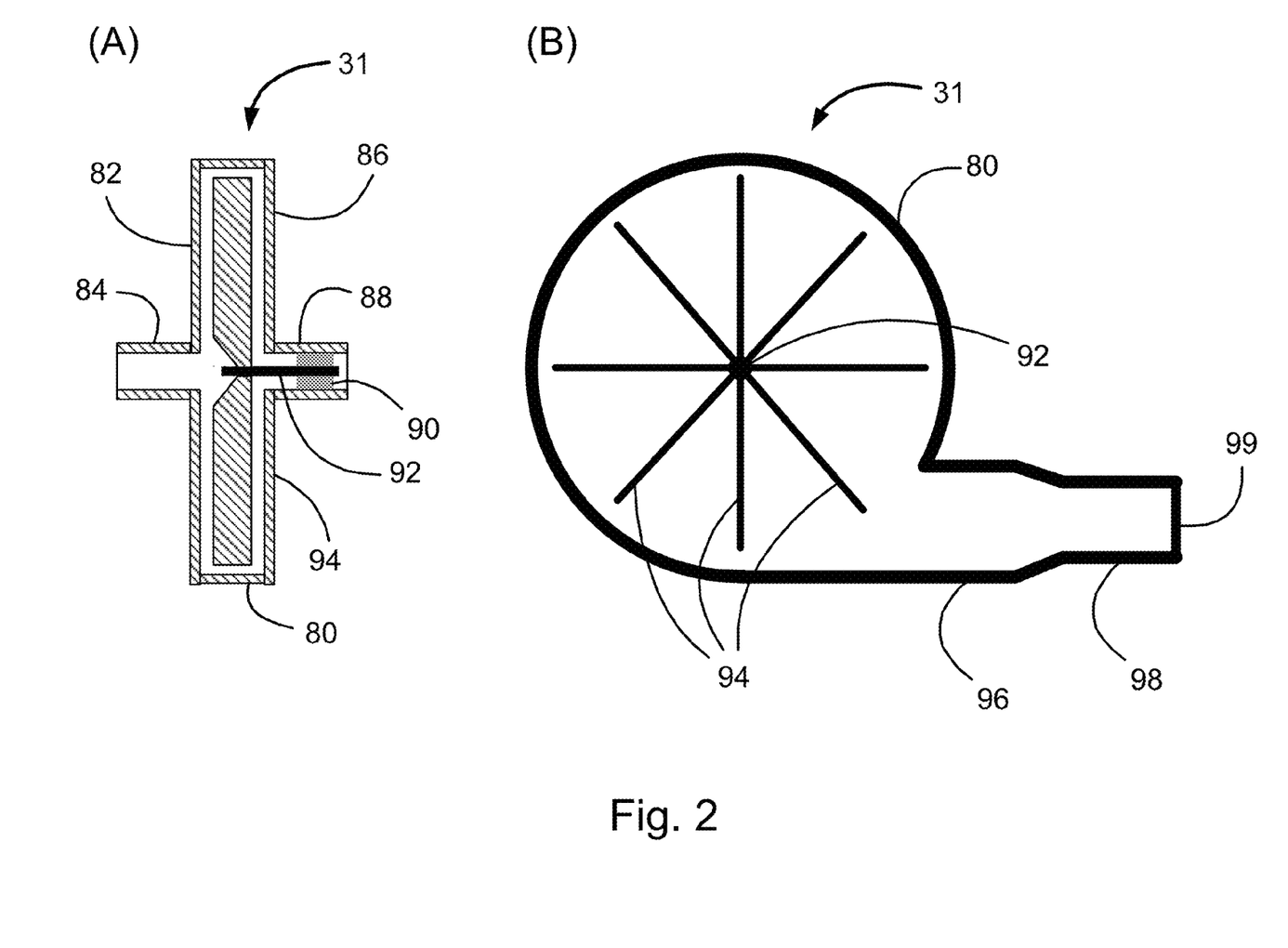

FIG. 1 shows an exemplary system of the present disclosure, generally identified by reference numeral 20, for recovery and disposal of a viscous fluid waste 6 from a holding tank 5. The system 20 comprises a hose 34 submersed into the fluid waste 6 at one end with the other end of hose 34 demountably engaged with a first port provided on a "tee" apparatus 40. A pump 33 is interposed the hose 34 for recovery of the fluid waste 6 into the hose 34 under a negative pressure and for delivery of the fluid waste 6 to the tee apparatus 40 under a positive pressure. Suitable pumps are exemplified by 3-inch diaphragm pumps powered by gasoline-fueled engines. Controls are provided (not shown) for adjusting the operating pressures provided by the pump 33 to the hose 34 to control the rate of flow of the fluid waste through the hose 34. Two hoppers 25, 35 are provided for separately holding therein and supplying therefrom a solidifying agent and a bulking material. The contents of each hopper 25, 35 are precisely metered into dispensing conduits 26, 36, respectively, and delivered into a conduit 30 engaged with a vacuum fan assembly 31. The vacuum fan assembly 31 commingles the solidifying agent and bulking material while delivering them into one end of a hose 32 with its other end engaged with a second port provided on the tee apparatus 40. A fan 35 is interposed hose 32 to provide additional pressure to facilitate delivery of the commingled solidifying agent and bulking material to the tee apparatus 40. An exemplary vacuum fan assembly 31 is shown in FIGS. 2(A), 2(B) and generally comprises a fan housing 80, an intake plate 82 provided with an intake port 84 for sealably engaging a conduit delivering supplies of solidifying agent and bulking material, and a back plate 86 provided with a drive housing 88. A drive device 90 housed within the drive housing 88 provides rotational drive to a shaft 92 to which are attached fan blades 94. Application of rotational force to shaft 92 causes the application of a negative pressure, i.e., a vacuum, by the rotating fan blades 94 to the intake port 84 and a positive pressure to the discharge housing 96 to discharge port 99. The negative pressure to the intake port 84 draws the supplies of solidifying agent and bulking material into the vacuum fan assembly 31 wherein they are commingled by the rotating fan blades 94 before being discharged by positive pressure through the discharge port 99. In this example, the diameter of the discharge port 99 is reduced by a reducer discharge housing integrally attached to the discharge housing 96. A suitable outer diameter of the vacuum fan assembly 31 may be 12 inches with a 10-inch diameter outer edge to outer edge blade length. The intake port 84 may have a diameter of about 4 inches while the discharge housing may have a diameter of about 4 inches which is reduced by the reducer discharge housing 98 to a diameter of about 3 inches at the discharge port 99. The exemplary vacuum fan assembly 31 shown in FIGS. 1, 2(A), 2(B) when powered by a hydraulic drive, will provide about 700 cfm to about 1000 cfm of positive pressure from the discharge port 99. Those skilled in these arts will understand that these dimensions may be modified as desired or necessary to provide vacuum fan assemblies with different size and load handling specifications. Suitable drive devices are exemplified by hydraulic drives, electrical motors, positive air pressure, negative air pressure, internal combustion engines, and the like.

The fluid waste 6 delivered into the first port of the tee apparatus 40 and the commingled solidifying agent and bulking material delivered into the second port of the tee apparatus 40 are concurrently discharged out of a third port provided on the tee apparatus 40 into a dump trailer 60. The concurrently discharged fluid waste and commingled solidifying agent and bulking material are shown as reference numeral 50 in FIG. 1. It is optional, if so desired, to provide equipment for agitation and or intermixing of the fluid waste 6 in the holding tank 5 so that the viscosity of the fluid waste can be adjusted and evenly distributed about the holding tank 5. FIG. 1 shows a conduit 15, with an interposed pump 10, having an intake end positioned within the fluid waste 6 near the bottom of the holding tank and discharge end positioned near the top of the fluid waste 6 at another location in the holding tank 5. Alternatively, the discharge end of the fluid waste mixing conduit 15 may be positioned above the surface of the fluid waste 6. Suitable pumps for mixing the waste fluid contents in a holding tank are exemplified by 4-inch centrifugal trash pumps engaged with (i) a 3-inch diameter intake pipe, and (ii) a 2-inch diameter discharge pipe.

Figure 3:
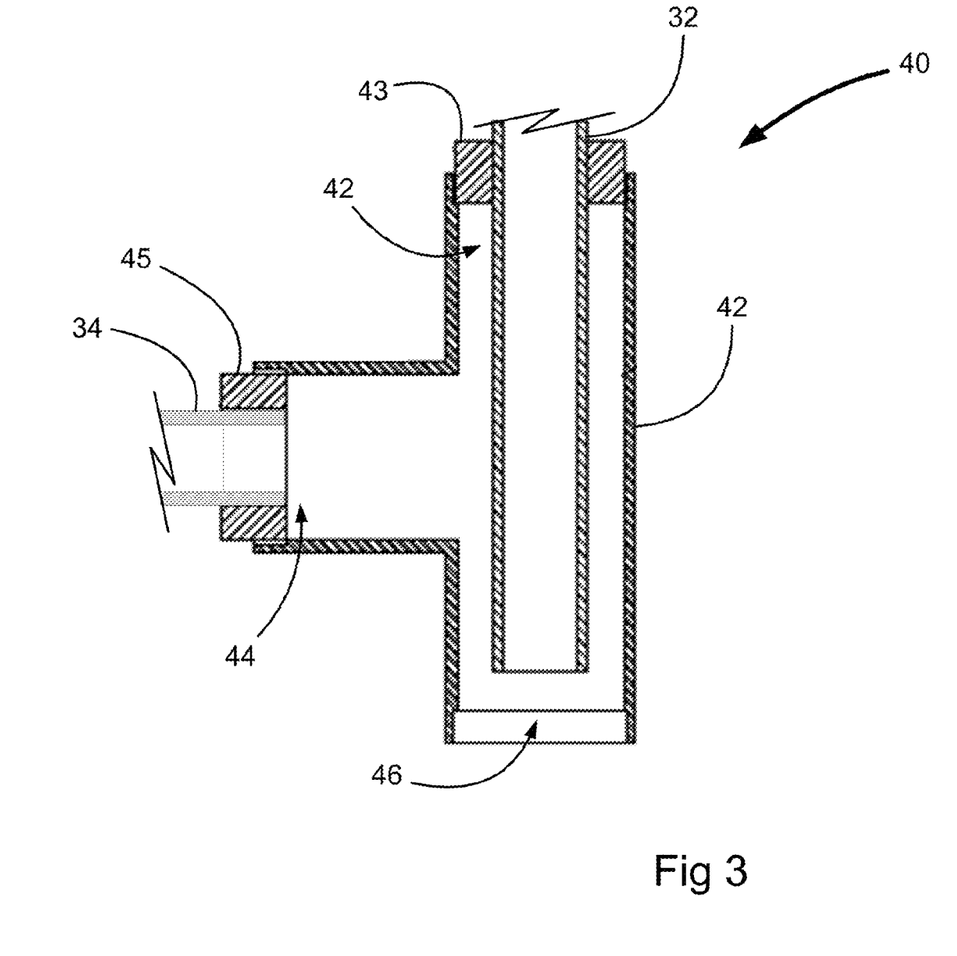
FIG. 3 is a cross-sectional view of a exemplary mixing and dispensing device according to another embodiment of the present disclosure.
Figure 4:
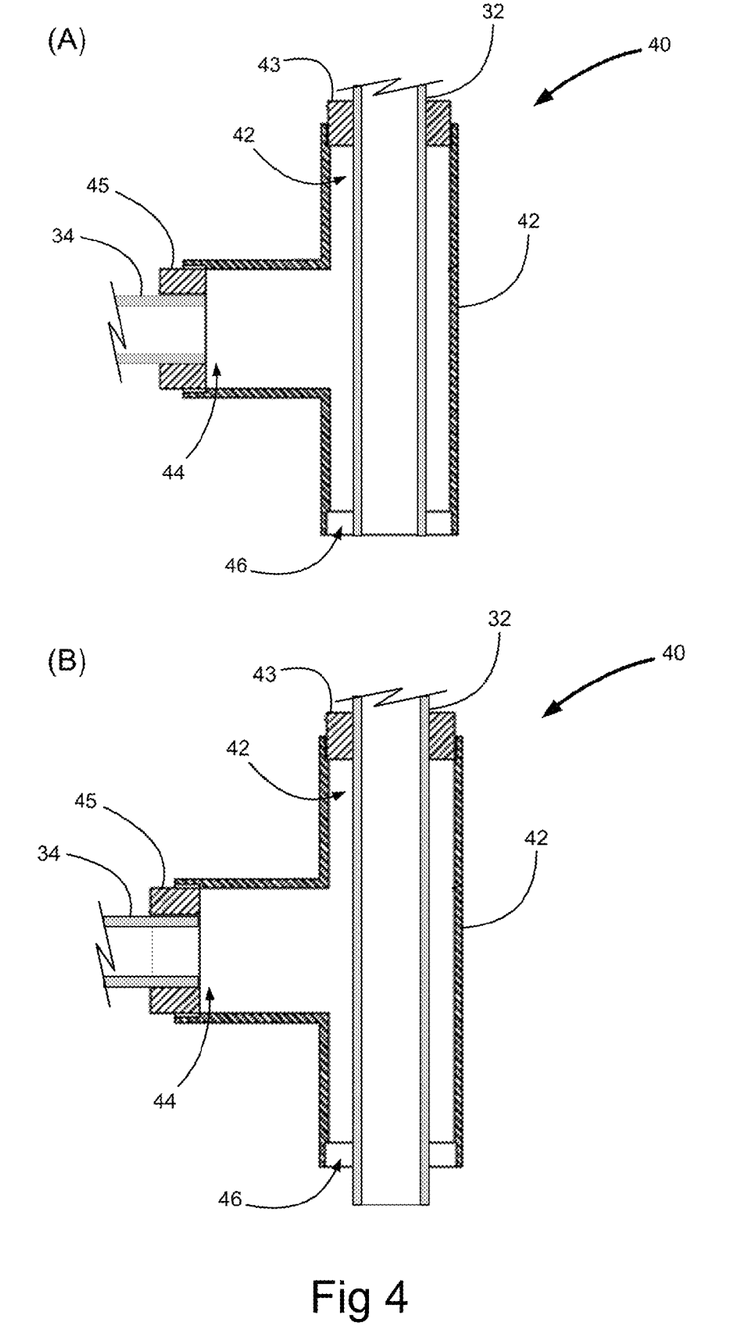

FIG. 3 is a cross-sectional view of the tee apparatus 40 showing the first port 42, the second port 44 and the third port 46. In this example, pipe 34 is sealably engaged with the second port 44 of the tee apparatus 40, by a quick-release device 45. Pipe 32 is sealably engaged with the first port 42 of the tee apparatus 40, by a quick-release device 43. Pipe 32 extends through the first port 42 into the tee apparatus 40 past the juncture with the second port 44 so that pipe 32 extends into the third port 46. It is optional for the end of pipe 32 to terminate at about the end of the third port 46 as shown in FIG. 4(A). It is also optional for the end of pipe 32 to extend beyond the end of the third port 46 as shown in FIG. 4(B). The commingled solidifying agent and bulking material are discharged from pipe 32 and out of the third port 46 as a continuous column of material. The fluid waste 6 delivered under pressure into the second port 44, swirls around pipe 32 and is discharged from the third port 46 of the tee apparatus as a continuous cylindrical flow that encircles the continuous column of commingled solidifying agent and bulking material (shown as reference numeral 50 in FIG. 1). The swirling motion of the discharged cylindrical flow of fluid wastes causes its contacting and intermixing with the flow of commingled solidifying agent and bulking material thereby initiating solidification of the fluid wastes. The mixture of fluid wastes, solidifying agent, and bulking material is partially gelled by the time it contacts the interior surfaces of a transportable bulk container and continues to complete the solidification process within the transportable bulk container. Completion of the solidification process generally occurs in minutes after the contacting/intermixing discharge of the fluid wastes and commingled solidifying agent and bulking material, for example, within about 1 minute to about 15 minutes, about 2 minutes to about 12 minutes, about 3 minutes to about 10 minutes. The solidified fluid waste is generally easily discharged from transportable bulk containers by dumping, i.e., raising one end of the container relative to the other end so that the solidified fluid waste is discharged from the lower end.

It is optional to line the bottom and the inner sides of the transportable bulk containers with a plastic liner to facilitate discharge of the solidified fluid wastes from the transportable bulk containers. Accordingly, another embodiment of the present disclosure pertains to an apparatus for dispensing a plastic liner from a roll so that the bottom of a transportable bulk container and the sides are partially covered by the plastic liner. The plastic liner dispensing apparatus may be mounted on the top front edge of a transportable bulk container. Alternatively, the plastic liner dispensing apparatus may be mounted on a framework attached to the top of a transportable bulk container.

Figure 5:
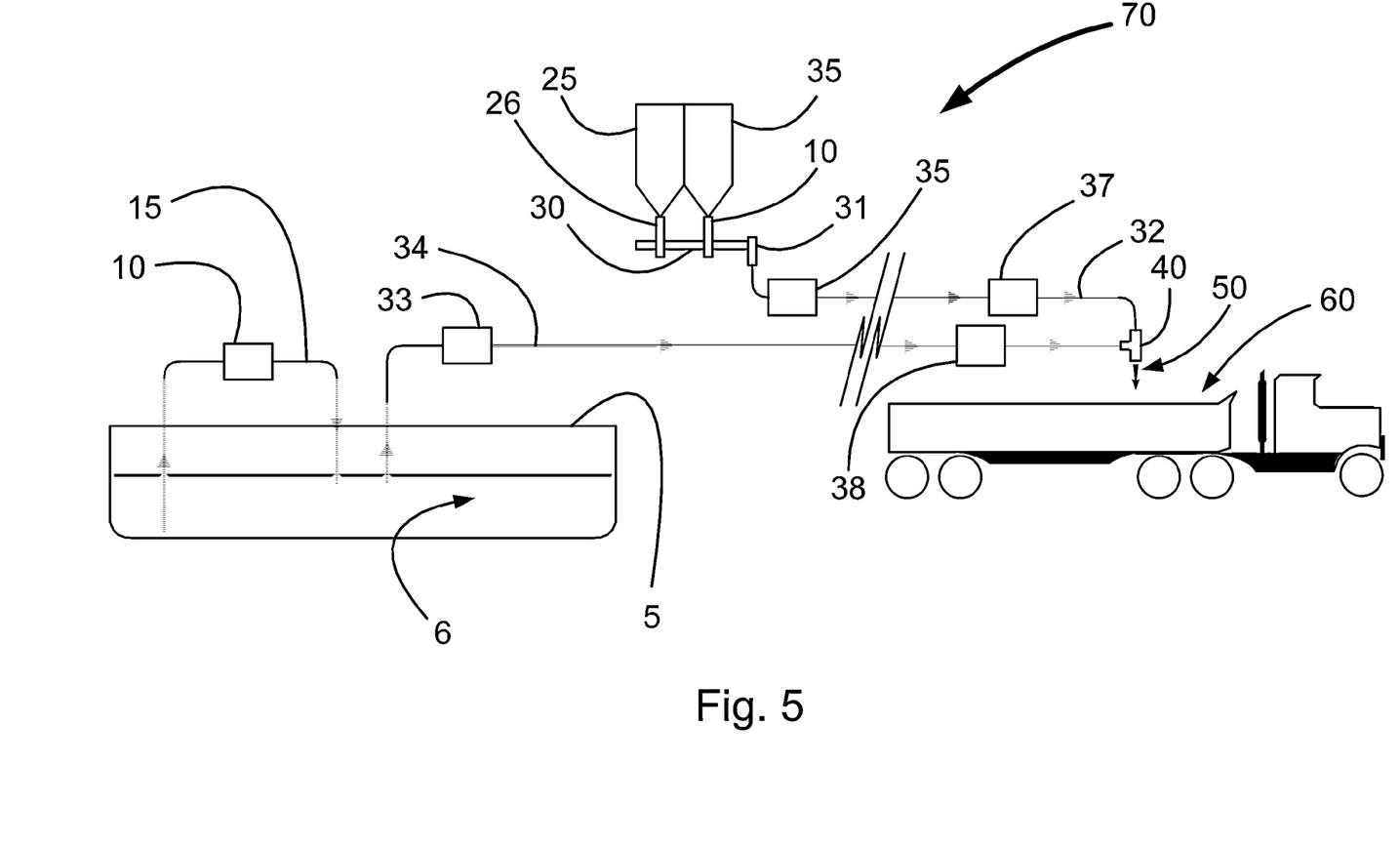
FIG. 5 is a schematic illustration of an exemplary system according to another embodiment of the present disclosure.

It may not be possible to locate and/or position the systems of the present disclosure, adjacent to or nearby some fluid waste holding facilities, because of where within an industrial processing site the holding facilities are positioned, or because of weather-created impediments to accessing a drilling site. Accordingly the systems of the present disclosure may be modified by the addition of one or more pumps interposed the fluid waste conveying conduits and the commingled solidifying agent and bulking material conveying conduits. FIG. 5 shows such an expansion of the system shown in FIG. 1. The exemplary expanded system, generally identified by reference numeral 70, comprises a hose 34 submersed into the fluid waste 6 at one end with the other end of hose 34 demountably engaged with a first port provided on a "tee" apparatus 40. A first pump 33 and a second pump 38 are interposed the hose 34 for recovery of the fluid waste 6 into the hose 34 under a negative pressure and for delivery of the fluid waste 6 to the tee apparatus 40 under a positive pressure. Controls are provided (not shown) for adjusting the operating pressures provided by the pumps 33, 38 to the hose 34 to control the rate of flow of the fluid waste through the hose 34. Two hoppers 25, 35 are provided for separately holding therein and supplying therefrom a solidifying agent and a bulking material. The contents of each hopper 25, 35 are precisely metered into dispensing tubes 26, 36, respectively, and delivered into a conduit 30 engaged with a vacuum fan 31. The vacuum fan 31 commingles the solidifying agent and bulking material while delivering them into one end of a hose 32 with its other end engaged with a second port provided on the tee apparatus 40. A first pump 35 and a second pump 37 are interposed hose 32 to provide additional pressure to facilitate delivery of the commingled solidifying agent and bulking material to the tee apparatus 40. The fluid waste 6 delivered into the first port of the tee apparatus 40 and the commingled solidifying agent and bulking material delivered into the second port of the tee apparatus 40 are concurrently discharged out of a third port provided on the tee apparatus 40 into a dump trailer 60. The concurrently discharged fluid waste and commingled solidifying agent and bulking material are shown as reference numeral 50 in FIG. 1.

The systems of the present invention may comprise two hoppers, each comprising dispensing tubes, mounted onto a trailer sized for towing by a suitable truck. Suitable trucks are exemplified by but are not limited to ½ ton pickup trucks, ¾ ton pickup trucks, 1 ton pickup trucks, 5 ton trucks, 10 ton trucks, single axle dump trucks, dual axle dump trucks, and the like. One hopper is provided for holding therein and supplying therefrom a solidifying agent. The other hopper is provided for holding therein and supplying therefrom a bulking material. The dispensing tubes from each hopper are engaged with a conduit provided with a vacuum fan at one end. The vacuum fan is provided with a port for engaging a conduit for delivering thereinto the materials dispensed from the two hoppers.

Alternatively, the two hoppers may be permanently installed into an industrial processing site adjacent to or nearby a fluid waste holding facility. Permanently installed hoppers may be sized to separately hold large quantities of solidifying agents or bulking materials, for example up to about 5 tonnes, up to about 10 tonnes, up to about 20 tonnes, up to about 40 tonnes, up to about 80 tonnes, up to about 100 tonnes, up to about 200 tonnes, up to about 300 tonnes.

Those skilled in these arts will realize that the methods, systems and apparatus of the present disclosure are also suitable for recovery and disposal of fluid wastes from storm drains and sewers, from holding facilities storing fluid waste streams generated by industrial processing operations or by food processing operations, from tailing water pond reservoirs receiving and storing fluid wastes from mining operations or from bitumen processing. The methods, systems and apparatus of the present disclosure are also suitable for recovery and disposal of sediments from fluid/solid interfaces at the bottoms of tailing water pond reservoirs receiving and storing fluid wastes from mining operations or from bitumen processing.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

The following is claimed:

1. A system for recovery of a fluid waste from a waste holding facility and solidification of the fluid waste during its discharge into a transportable bulk container, the system comprising:
   a tee apparatus having a first port for receiving therethrough a flow of the fluid waste, a second port for receiving therethrough a commingled supply of a solidifying agent and a bulking material, and a third port for concurrently discharging therethrough the fluid waste and commingled solidifying agent and bulking material;
   a supporting framework for mounting thereon the tee apparatus;
   a first conduit for recovering and conveying the fluid waste to the tee apparatus;
   a first device for conveying the fluid waste along the first conduit;
   a supply of the solidifying agent;
   a supply of the bulking material;
   a second device for receiving and commingling the supply of the solidifying agent and the supply of the bulking material;
   a second conduit for conveying the commingled supply of the solidifying agent and the bulking material to the tee apparatus; and
   a third device for conveying the commingled supplies of the solidifying agent and the bulking material along the second conduit,
   wherein the supporting framework and tee apparatus are positionable above the transportable bulk container.

2. The system of claim 1, wherein the framework is demountably engageable onto a side portion or a top portion of a transportable bulk container.

3. The system of claim 1, wherein the framework is standalone and self-supporting infrastructure under which a transportable bulk container can be positioned and repositioned.

4. The system of claim 1, wherein the solidifying agent is a superabsorbent polymer.

5. The system of claim 1, wherein the solidifying agent is a superabsorbent polymer selected from a group consisting of by sodium polyacrylates, polyacrylamide copolymers, ethylene maleic anhydride copolymers, cross-linked carboxymethylcellulose, polyvinyl alcohol copolymers, cross-linked polyethylene oxide, starch-grafted copolymers of polyacrylonitrile, and mixtures thereof.

6. The system of claim 1, wherein the bulking material is selected from a group consisting of pulverized sawdust pellets, pulverized wood pellets, shredded wood chips, peat, and combinations thereof.

7. The system of claim 1, wherein the ratio of solidifying agent to bulking material is selected from a range of about 0.25:1 (w:w) to about 4:1 (w/w).

8. The system of claim 1, wherein the ratio of solidifying agent to bulking material is selected from a group consisting of about 0.25:1 (w:w), about 0.5:1 (w:w), 0.75:1(w:w), 1:1 (w:w), 1.5:1 (w:w), 2:1 (w:w), 3:1 (w:w), and 4:1 (w:w).

9. A method for recovery of a fluid waste from a waste holding facility and solidification of the fluid waste during its discharge into a transportable bulk container, the method comprising the steps of:
   recovering the fluid waste from a holding facility and conveying said fluid waste into and through a first port provided therefore in a tee apparatus;
   commingling a supply of a superabsorbent polymer and a supply of a bulking material, and conveying the commingled and bulking material into and through a second port provided therefore in the tee apparatus; and
   concurrently discharging the fluid waste and the commingled solidifying agent and bulking material from a third port provided therefore in the tee apparatus into the transportable bulk container.

10. The method of claim 9, wherein the superabsorbent polymer is selected from a group consisting of sodium polyacrylates, polyacrylamide copolymers, ethylene maleic anhydride copolymers, cross-linked carboxymethylcellulose, polyvinyl alcohol copolymers, cross-linked polyethylene oxide, starch-grafted copolymers of polyacrylonitrile, and combinations thereof.

11. The method of claim 9, wherein the bulking material is selected from a group consisting of pulverized sawdust pellets, pulverized wood pellets, shredded wood chips, peat, and combinations thereof.

12. The method of claim 9, wherein the ratio of solidifying agent to bulking material is selected from a range of about 1:10 (w:w) to about 1:0.5 (w:w).

13. The method of claim 9, wherein the ratio of solidifying agent to bulking material is selected from a group consisting of about 1:10 (w:w), about 1:7.5 (w:w), about 1:5 (w:w), about 1:4.5 (w:w), about 1:4 (w:w), about 1:3.5 (w:w), about 1:3 (w:w), about 1:2.5 (w:w), about 1:2 (w:w), about 1:1.5 (w:w), about 1:1 (w:w), about 1:0.5 (w:w).

14. The method of claim 9, wherein the fluid waste is a spent drilling fluid.

15. The method of claim 9, wherein the fluid waste is an industrial processing fluid waste.

16. The method of claim 9, wherein the fluid waste is a food processing fluid waste.

17. The method of claim 9, wherein the fluid waste is recovered from a tailing pond reservoir holding fluid wastes produced during processing of mineral ores.

18. The method of claim 9, wherein the fluid waste is a sediment slurry recovered from a tailing pond reservoir holding fluid wastes produced during processing of mineral ores.

19. The method of claim 9, wherein the fluid waste is recovered from a tailing pond reservoir holding fluid wastes produced during processing of bitumen.

20. The method of claim 9, wherein the fluid waste is a sediment slurry recovered from a tailing pond reservoir holding fluid wastes produced during processing of bitumen.

* * * * *